(12) United States Patent
Walklin

(10) Patent No.: US 6,542,280 B2
(45) Date of Patent: Apr. 1, 2003

(54) RETURN-TO-ZERO OPTICAL MODULATOR WITH CONFIGURABLE PULSE WIDTH

(75) Inventor: Sheldon Walklin, Kanata (CA)

(73) Assignee: Innovance, Inc., Piscataway, NJ (US)

( * ) Notice: Subject to any disclaimer, the term of this patent is extended or adjusted under 35 U.S.C. 154(b) by 52 days.

(21) Appl. No.: 09/858,373

(22) Filed: May 16, 2001

(65) Prior Publication Data

US 2002/0171903 A1 Nov. 21, 2002

(51) Int. Cl.[7] .............................. G02F 1/01; G02F 1/03
(52) U.S. Cl. ...................................... 359/276; 359/245
(58) Field of Search ................................ 359/184, 186, 359/245, 276

(56) References Cited

U.S. PATENT DOCUMENTS 5,625,722 A * 4/1997 Froberg et al. ................ 385/1

* cited by examiner

Primary Examiner—Georgia Epps
Assistant Examiner—David N. Spector
(74) Attorney, Agent, or Firm—Hayes Soloway P.C.

(57) ABSTRACT

A return-to-zero (RZ) modulator for an optical transmitter comprises a Mach-Zehnder interferometer optically coupled with a light source for modulating a continuous wave generated the said light source with a drive signal. A drive circuit generates a drive signal for modulating the Mach-Zehnder device to generate an optical RZ pulse signal with adjustable width. The drive circuit comprises a trigger flip-flop for converting a non-return to zero (NRZ) signal to a modified drive signal. A method of generating an optical RZ pulse signal comprises converting a non-return to zero (NRZ) signal to a modified drive signal, and modulating a continuous wave from a light source with the modified drive signal to generate an optical RZ pulse signal. The width of the pulses in the optical RZ pulse signal is controlled by adjusting the rise and fall time of the modified drive signal.

18 Claims, 2 Drawing Sheets

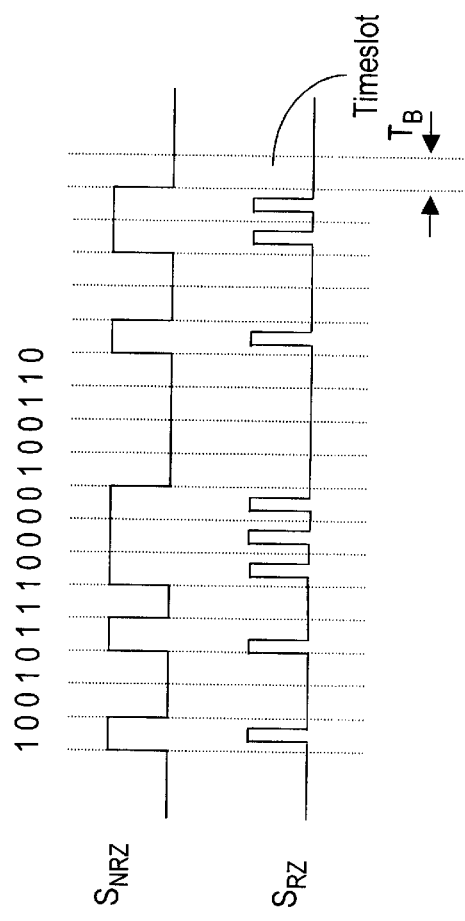
FIGURE 1A
FIGURE 1B
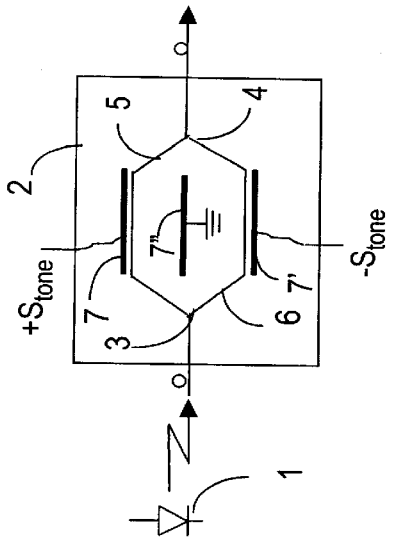
FIGURE 1D
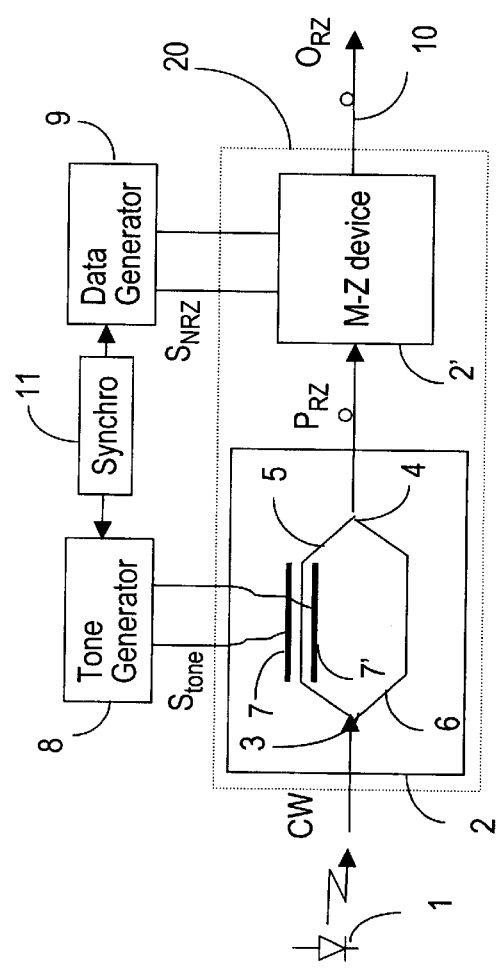
FIGURE 1C (Prior Art)

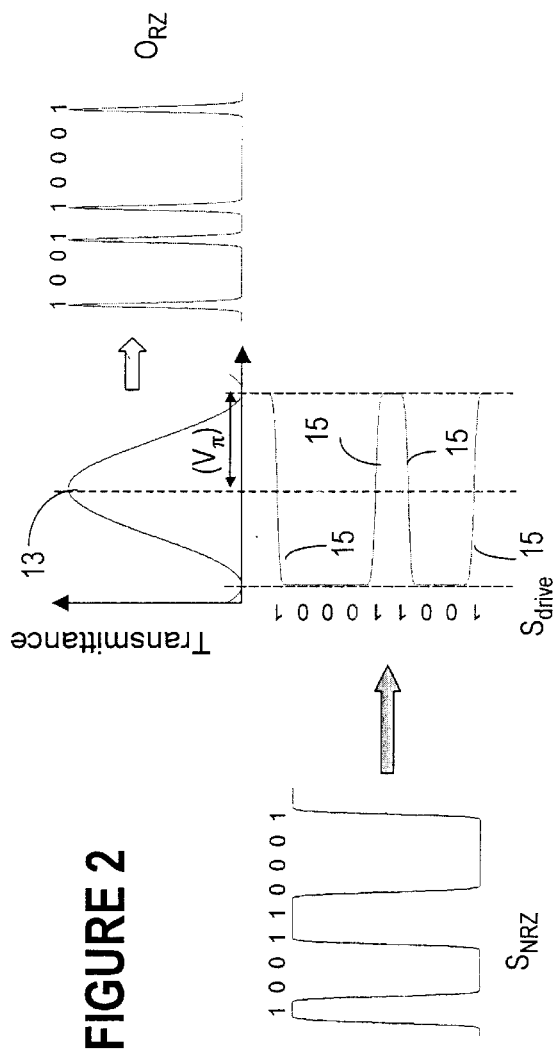
FIGURE 2
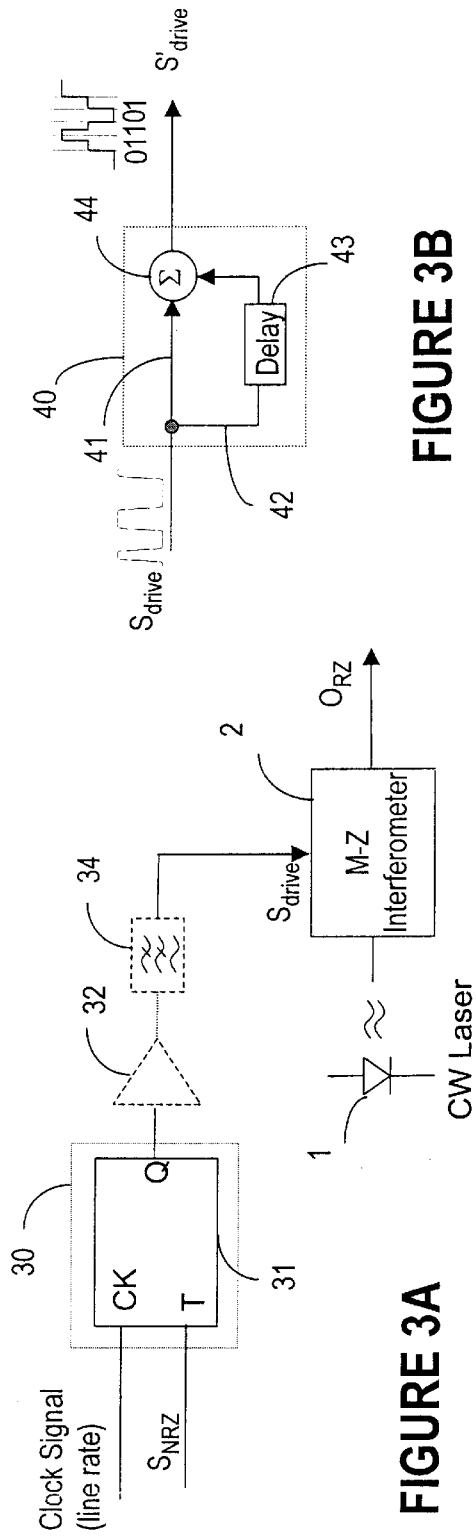
FIGURE 3A
FIGURE 3B

RETURN-TO-ZERO OPTICAL MODULATOR WITH CONFIGURABLE PULSE WIDTH

BACKGROUND OF THE INVENTION

The invention is directed to a telecommunication network, and in particular to a return-to-zero optical modulator with configurable pulse width.

A typical 10 Gbps system uses non-return-to-zero (NRZ) coding formats to create a 10-Gbps signal, most often using a DFB laser and an external modulator to encode the signal.

Return-to-zero (RZ) encoding has lately emerged for ultra-long-haul 10 Gbps (for example in submarine transmission systems) and long-haul 40 Gbps because the RZ encoded signal has a higher peak power, providing a high signal-to-noise ratio and a corresponding low bit error rate. RZ also offers good immunity to the effects of polarization-mode dispersion (PMD) and polarization dependent loss (PDL), and can benefit from fiber nonlinear effects such as self phase modulation. Because symbols are isolated from one another, RZ pulses can take advantage of the soliton effect that arises from the interaction between fiber dispersion and self-phase modulation.

On the other hand, NRZ signals require a single external modulator, while RZ signals typically require two modulators in cascade, one to modulate the data and one to generate the RZ pulse shape, adding cost and complexity. In some cases, a third MZ is used to impart phase modulation (frequency chirp) on the RZ pulses. With this conventional approach, the RZ pulse generator is driven with a sinusoid at the line rate or one-half the line rate, depending on the bias point of the MZ, and the data modulator is driven with the NRZ modulated electrical signal. The resulting RZ pulse width is generally constrained to a full-width, half-maximum (FWHM) of 33%, 50% or 67% of a bit period when the MZ is biased at, respectively, maximum transmittance, one-half maximum transmittance, and minimum transmittance.

Having to use a second MZ device to generate RZ pulses, not only requires additional space in the transmitter terminal, but also adds cost to the terminal. In addition, the constraint on RZ pulse width limits a designer's ability to optimize a system based on RZ pulse width. This cost is most important in DWDM systems, where each channel has its own transmitter, and the number of channels is currently up to 160.

SUMMARY OF THE INVENTION

It is an object of the invention to provide an optical modulator for optical communication of RZ encoded signals, which alleviates totally or in part the drawbacks of the prior art network architectures.

Accordingly, the invention provides for a return-to-zero (RZ) modulator for an optical transmitter, comprising a Mach-Zehnder device optically coupled with a light source for modulating a continuous wave generated by the light source with a modified drive signal; and a drive circuit for modulating the Mach-Zehnder device to generate an optical RZ pulse signal with adjustable width.

The invention also provides a method of generating an optical RZ pulse signal comprising: converting a non-return to zero (NRZ) signal to a modified drive signal, and modulating a continuous wave from a light source with the modified drive signal to generate an optical RZ pulse signal.

The invention provides for a less expensive optical terminal than the traditional solutions, due to the use of a single M-Z device. Additional cost savings are obtained since one bias circuit is necessary, as opposed to two such circuits when two M-Z devices are used.

Still another advantage of the invention is that it allows adjusting the width of the pulses in the optical signal.

BRIEF DESCRIPTION OF THE DRAWINGS

The objects, features and advantages of the invention will be apparent from the following more particular description of the preferred embodiments, as illustrated in the appended drawings, where:

FIG. 1A shows a NRZ encoded drive signal;

FIG. 1B illustrates a RZ encoded drive signal;

FIG. 1C shows a conventional RZ external modulator, with an R-Z device operating in a single-ended mode;

FIG. 1D shows a M-Z device operating in a push-pull mode;

FIG. 2 illustrates the principle of operation of a RZ modulator according to the invention;

FIG. 3A shows an embodiment of the RZ modulator according to the invention; and.

FIG. 3B shows a circuit for controlling the width of the pulses in the optical RZ signal.

DESCRIPTION OF THE PREFERRED EMBODIMENTS

First, the current modulation method is described in some detail with reference to FIGS. 1A, 1B, 1C for a better understanding of the structure, characteristics and operation of the modulation technique according to the invention.

A number of coding techniques are used in communication systems (electrical or optical) to transmit a signal between a transmitting terminal and a receiving terminal.

FIG. 1A shows a non-return-to-zero (NRZ) waveform while FIG. 1B shows a return-to-zero (RZ) waveform. NRZ is probably the most commonly used encoding. A binary '1' is represented by one level, and a binary '0' is represented by another level, extending over the entire timeslot. There is a change in level whenever the data changes from a '1' to a '0' or from a '0' to a '1'.

For RZ encoding, a '1' is represented by a pulse with a width less than a timeslot, and a '0' is represented by the absence of a pulse.

As shown in FIG. 1C, in current optical transmission systems, the transmitter includes a laser 1 operating in continuous wave (CW) mode, and an external modulator 20, for controlling the amount of continuous optical power transmitted in the fiber with the signal to be transmitted. FIG. 1C shows a Mach-Zehnder (M-Z) interferometer 2 used to provide the RZ pulse shape, and a second M-Z interferometer 2' used to modulate the data (information) over the RZ pulses. An M-Z interferometer, such as shown in some detail for interferometer 2, comprises a pair of wave-guide channels 5, 6 or arms, connected between an optical wave-guide splitter 3, and a wave-guide combiner 4. The light source 1 is optically coupled to the wave-guide splitter 3. The two light beams from the splitter travel through the wave-guide arms 5, 6 and are reunited by the wave-guide combiner 4. The recombined light exits the output port of the wave-guide combiner and is then optically coupled to the second M-Z interferometer 2'.

The optical M-Z interferometer operates on the principle of interference between the two optical waves, the interference condition being controlled using the electrodes (traveling wave electrodes) 7 and 7' placed along arm 5 in this embodiment (single-ended modulation). Assuming that the arms of the M-Z device are balanced, whenever the two beams arrive at combiner 4 in phase the modulating voltage $P_{RZ}$ is zero (logic '0'), giving an intensity maximum, or an "on" condition. Conversely, a maximum (logic '1') modulating voltage $P_{RZ}$ results for a differential phase change of π(180°), giving rise to an intensity minimum or "off" condition.

It is possible to place an electrode on the second arm as in FIG. 1D (push-pull mode of operation).

A tone generator 8 provides generally a sinusoidal signal $S_{tone}$ (sinusoid, or tone) at the line frequency, and a data generator 9 provides the data (information) signal $S_{NRZ}$. $S_{tone}$ is applied on the electrode(s) of the M-Z device 2 to generate optical pulses $P_{RZ}$ of equal amplitude, occupying in general ½ of the bit period. A high-power sinusoid is required to drive M-Z device 2.

The second M-Z device 2' receives the optical pulses $P_{RZ}$ output from the first interferometer, while the data (information) signal $S_{NRZ}$ is applied on the electrode(s) in electrical format. M-Z device 2' modulates the optical pulses $P_{RZ}$ with the data (information) $S_{NRZ}$ which is encoded in NRZ format. The RZ modulated optical signal is thereafter coupled over the transmission line 10. The phase of $S_{NRZ}$ signal (i.e. generator 9) and the $S_{tone}$ signal (i.e. generator 8) must be carefully aligned. A synchronizer 11 intuitively shows that $S_{NRZ}$ signal and the $P_{RZ}$ pulses are in synchronism, so that each bit in the data signal $S_{NRZ}$ corresponds to a $P_{RZ}$ pulse.

As indicated above, the modulator 20 of FIG. 1C is expensive in that it uses two M-Z modulators, which are costly. In principle, a modulated RZ signal could be obtained from a single MZ device by applying $S_{NRZ}$ signal in RZ format to the M-Z interferometer 2, and not using device 2'. However, such an approach would require very high electrical bandwidth, for both the drive circuit and the modulator, and would be increasingly impractical for generating narrower RZ pulses.

The present invention proposes a new solution for a RZ optical modulator, using a single M-Z interferometer, in an arrangement that also allows adjusting the width of the pulses in the optical signal.

FIG. 2 illustrates the principle of operation of an RZ modulator according to the invention. As shown, a NRZ encoded electrical signal $S_{NRZ}$ is converted to a modified drive signal denoted with $S_{drive}$ before being applied to drive a M-Z modulator. Each logical '1' in the original NRZ signal is mapped to a transition 15 in the drive signal, whereas logical '0s' in the original signal $S_{NRZ}$ are mapped to no transition. Hence, the drive signal $S_{drive}$ is NRZ-like, where transitions between states represent a logical '1', and where no transition represents a logical '0'. The peak-to-peak amplitude of the drive signal is set to $2V_{\pi}$, where $V_{\pi}$ is the switching voltage for the M-Z device, and applied to the M-Z biased at maximum transmittance 13.

The M-Z device converts the drive signal into optical signal $O_{RZ}$, which is RZ modulated. The width of RZ pulses can be controlled by the rise and fall time of the drive signal.

FIG. 3A shows an embodiment of a RZ modulator according to the invention. A NRZ signal and a clock signal at the line rate are usually available at a transmitter. These signals are used with a format converter 30 to obtain the desired drive signal $S_{drive}$. The format converter 30 may for example be comprised of a clocked-trigger flip-flop 31, which is clocked at roughly the middle of an NRZ data bit. An optional driver amplifier 32 can be used to boost the drive signal, if required. A low-pass filter 34 can be used to increase the rise and fall time in the drive signal, i.e., to control the optical RZ pulse width. Filter 34 allows controlling the width of pulses in the $O_{RZ}$ signal up to 33% of the bit period.

The main practical consideration is that the peak-to-peak amplitude of the drive signal must be $2V\pi$, which is generally between 6 and 12 volts for current MZ devices 2 operating at 10 Gbits. Although a high-power driver may be used, a practical implementation would likely operate the MZ in a push-pull mode, which would reduce the required drive amplitude by one-half. Reducing the drive amplitude is desirable because a larger selection of high bandwidth drivers would then be available.

The minimum achievable rise and fall time is limited by the bandwidth of the trigger flip-flop output, the following driver amplifier (if one is used), and the electrical bandwidth of the M-Z device. Because higher bandwidth devices usually cost more, the bandwidth of these devices would likely be specified to achieve a desired pulse width, for which an increase in the rise and fall time would not be needed, i.e., no low-pass filter 34 would be required. For example, to generate RZ pulses with a FWHM (full width half maximum) of ~25% of a bit period, the required electrical bandwidth is roughly equivalent to that needed for a conventional NRZ modulated electrical signal operating at the same bit rate.

As indicated above, filter 34 allows adjusting the pulse width up to 33% of a bit period. Pulse width control circuit 40 shown in FIG. 3B allows generation of wider $O_{RZ}$ pulses.

As shown in FIG. 3B, the modified driving signal at the output of format converter 30 is split into two components 41 and 42. One of the components, here component 42, is delayed by block 43 with a delay time less than the bit period $T_B$. Delay block 43 could be a delay line or any suitable circuit. The subsequent combination of the components 41 and 42 in an add circuit 44, results in a transition time adjustable drive signal $S'_{drive}$ with a slower transition time 15, as shown at the output of circuit 40 in FIG. 3B. The transition time of the pulses in the $S'_{drive}$ can easily be adjusted by selecting the delay introduced by block 43. With a drive signal such as $S'_{drive}$, the width of the $O_{RZ}$ pulses can be increased beyond 33% of the bit period. The pulse width control circuit 40 can be integrated into the format converter 30 or driver amplifier 32.

Wider pulses however will require wider bandwidth from the format converter 30 output and driver amplifier 32, and the M-Z device 2 in order to prevent inter-symbol interference (ISI) in the modified electrical drive signal.

I claim:

1. A return-to-zero (RZ) modulator for an optical transmitter, comprising:
    a Mach-Zehnder device optically coupled with a light source for modulating a continuous wave generated by said light source with a modified drive signal; and
    a drive circuit for modulating said Mach-Zehnder device to generate an optical RZ pulse signal with adjustable width.

2. A RZ modulator as claimed in claim 1, wherein said drive circuit comprises a format converter for converting a non-return to zero (NRZ) signal to said modified drive signal.

3. A RZ modulator as claimed in claim 2, wherein said format converter is a trigger flip-flop with a clock input, a trigger input and an output, for receiving a clock signal at transmission rate on said clock input and receiving said NRZ signal on said trigger input and providing said modified drive signal on said output.

4. A RZ modulator as claimed in claim 3, wherein said drive circuit further comprises an amplifier for boosting said modified RZ signal.

5. A RZ modulator as claimed in claim 3, wherein said drive circuit further comprises a low-pass filter for controlling the width of said optical RZ pulse signal.

6. A RZ modulator as claimed in claim 3, wherein said drive circuit further comprises a pulse width control circuit for receiving said modified drive signal from said format converter, adjusting the transition time of the pulses in said modified drive signal and providing a transition time adjustable drive signal.

7. A RZ modulator as claimed in claim 6, wherein said pulse width control circuit comprises:
a splitter for splitting said modified drive signal into a first and a second component;
a delay circuit for receiving said second component and providing a delayed component; and
a summing circuit, for adding said first component with said delayed component, to obtain said transition time adjustable drive signal.

8. A method of generating an optical RZ pulse signal comprising:
providing a format converter for converting a non-return to zero (NRZ) signal to a modified drive signal;
modulating a continuous wave from a light source with said modified drive signal to generate an optical RZ pulse signal; and
controlling the width of the pulses in said optical RZ pulse signal by adjusting the transition time of said modified drive signal.

9. A method of generating an optical RZ pulse signal comprising:
providing a trigger flip-flop with a clock input, a trigger input and an output;
applying a clock signal at a transmission rate on said clock input, and a non-return to zero (NRZ) signal on said trigger input for obtaining a modified drive signal on said output; and
modulating a continuous wave from a light source with said modified drive signal to generate an optical RZ pulse signal.

10. A method as claimed in claim 8, further comprising amplifying said modified drive signal with a driver amplifier connected in the path of said modified drive signal.

11. A method of generating an optical RZ pulse signal comprising:
providing a format converter for converting a non-return to zero (NRZ) signal to a modified drive signal;
modulating a continuous wave from a light source with said modified drive signal to generate an optical RZ pulse signal; and
controlling the width of said optical RZ pulse signal with a low-pass filter connected in the path of said modified drive signal.

12. A method as claimed in claim 8, wherein said step of modulating comprises:
optically coupling said light source to a Mach-Zehnder device;
biasing said Mach-Zehnder device to obtain maximum transmittance; and
connecting said modified drive signal to the drive input of said Mach-Zehnder device and setting the amplitude of said modified drive signal to $2V_\pi$.

13. A method as claimed in claim 12, wherein the amplitude of said modified RZ signal is generally between 6 and 12 volts, for a Mach-Zehnder device operating at said transmission rate.

14. A method as claimed in claim 12, wherein said step of connecting comprises connecting said Mach-Zehnder device to operate in a push-pull mode, to reduce the peak-to-peak amplitude of said modified drive signal to $V_\pi$.

15. A method as claimed in claim 12, further comprising selecting said Mach-Zehnder according to a specified electrical bandwidth, and in conjunction with the output bandwidth of said format converter for achieving a provisioned width of the pulses in said optical RZ pulse signal.

16. A method as claimed in claim 8, wherein said step of controlling the width of said optical RZ pulse signal comprises connecting a pulse width control circuit in the path of said modified drive signal.

17. A method as claimed in claim 8, wherein said step of controlling the width of said optical RZ pulse signal comprises:
splitting said modified drive signal into a first and a second component;
delaying said second component to obtain a delayed component;
adding said first component with said delayed component, to obtain a transition time adjustable drive signal; and
driving said M-Z device with said transition time adjustable drive signal.

18. A method as claimed in claim 17, further comprising adjusting the delay of said second component for controlling the transition time of said time adjustable drive signal.

* * * * *